United States Patent
Choi

(10) Patent No.: US 7,421,530 B2
(45) Date of Patent: Sep. 2, 2008

(54) NOISE ATTENUATING BUS STRUCTURE AND METHOD FOR A MOBILE COMMUNICATION

(75) Inventor: Sang-Hun Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 99 days.

(21) Appl. No.: 11/021,228

(22) Filed: Dec. 23, 2004

(65) Prior Publication Data

US 2005/0144350 A1  Jun. 30, 2005

(30) Foreign Application Priority Data

Dec. 24, 2003  (KR)  ............... 10-2003-0096861

(51) Int. Cl.
*G06F 13/14* (2006.01)
(52) U.S. Cl. .................... 710/305; 326/21
(58) Field of Classification Search ........ 710/100, 710/107, 305; 455/73; 370/201; 326/21
See application file for complete search history.

(56) References Cited

U.S. PATENT DOCUMENTS 5,996,039 A * 11/1999 Lee .................... 710/316
6,681,125 B1 * 1/2004 Woo .................. 455/556.1
2004/0053578 A1 * 3/2004 Grabon et al. ........... 455/73
2005/0088384 A1 * 4/2005 Kayada et al. .......... 345/84
2005/0201333 A1 * 9/2005 Santhoff et al. ......... 370/333

FOREIGN PATENT DOCUMENTS

| CN | 1067541 | 12/1992 |
|----|---------|---------|
| CN | 1309487 | 8/2001 |
| JP | 2001036608 | 2/2001 |
| JP | 2002-176470 | 6/2002 |

* cited by examiner

*Primary Examiner*—Clifford H Knoll
(74) *Attorney, Agent, or Firm*—Lee, Hong, Degerman, Kang & Schmadeka

(57) ABSTRACT

A bus structure of a mobile communication terminal for reducing digital noise is disclosed. The bus structure comprises a bus switch controller, a first element having a first bus, a second element having a second bus, and a common bus for connecting the first bus and the second bus. A bus switch positioned between the first element and the second element for disconnecting at least one of the first bus and the second bus from the common bus in response to a control signal from the bus switch controller for reducing digital noise of the common bus.

19 Claims, 3 Drawing Sheets

NOISE ATTENUATING BUS STRUCTURE AND METHOD FOR A MOBILE COMMUNICATION

CROSS-REFERENCE TO RELATED APPLICATIONS

Pursuant to 35 U.S.C. § 119(a), this application claims the benefit of earlier filing date and right of priority to Korean Application No. 10-2003-0096861 filed on Dec. 24, 2003, contents of which are hereby incorporated by reference herein in its entirety.

BACKGROUND OF THE INVENTION

1. Field of the Invention

The present invention relates to a bus structure and method capable of attenuating digital noise affecting reception sensitivity of a mobile communication terminal.

2. Description of the Related Art

A bus structure of a mobile communication terminal connects several elements such as a mobile station modem (MSM), memory, liquid crystal display (LCD), and digital signal processor (DSP). The terminal uses the common bus for addressing memory.

FIG. 1 illustrates a conventional bus structure of a mobile communication terminal.

A MSM 1, a memory 2, and a LCD module 5 are connected to a common bus 3, for example a 8-bit or 16-bit bus structure. The MSM 1 serves as a master controller for the conventional bus structure.

The MSM 1 reads data from the memory 2, the LCD module 5, or writes data into the memory 2 by way of the common bus 3. While the MSM 1 is accessing the memory 2 for performing a read or write function, the LCD module is connected to the common bus 3. In another example, while the MSM 1 is accessing the LCD module 5, the memory 2 is connected to the common bus 3. In summary, the memory 2 and the LCD module 5 are continuously connected to the common bus 3. Upon accessing the memory 2 or the LCD module 5, a pulse signal flows into the LCD module 5 or memory 2 generating digital noise.

In the conventional common bus structure, digital noise is radiated from each element such as the LCD module 5 and the memory 2. The digital noise causes a loss of radio sensitivity of the terminal. As shown in FIG. 1, the MSM 1 and the memory 2 are separated from RF blocks and positioned at a lower portion 10 of the folder. The LCD module 5 is positioned at an upper portion 20 of the folder through a flexible printed circuit board (FPCB). The LCD module 5 is connected to the common bus 3. The LCD module 5 being farthest from the MSM 1 generates most of the radiated digital noise.

The conventional terminal having the conventional bus structure has increased digital noise decreasing radio sensitivity of the mobile communication terminal. With increased speed bus processes, digital noise would cause a serious problem to the terminal.

Therefore, there is a need for a bus structure that overcomes the above problems and provides other advantages over conventional structures.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In one embodiment, a bus structure of a mobile communication terminal is provided. The structure comprises a bus switch controller, a first element having a first bus, a second element having a second bus, and a common bus for connecting the first bus and the second bus. A bus switch positioned between the first element and the second element for disconnecting at least one of the first bus and the second bus from the common bus in response to a control signal from the bus switch controller for reducing digital noise of the common bus.

The first element is preferably a memory and the second element is preferably a liquid crystal display module. The second element may be distally located from the bus controller. The bus switch is preferably positioned at a first stage of the second bus. The bus switch is preferably a tri-state buffer. In one example, if the first element uses the common bus, the bus switch disconnects the second bus from the common bus. In another example, if the second element uses the common bus, the bus switch connects the second bus of the second element to the common bus.

In another embodiment, a method is disclosed for disconnecting elements along a bus structure of a mobile communication terminal. The method comprises providing a control signal to a bus switch controller for at least one of connecting to or disconnecting from a common bus a first bus of a first element, and providing the control signal to the bus switch controller for at least one of connecting to or disconnecting from the common bus a second bus of a second element, wherein the bus switch controller detects a first status of the first element and a second status of the second element and modifies the control signal for reducing digital noise of the common bus.

The first element is preferably a memory and the second element is preferably a liquid crystal display module. The second element may be distally located from the bus switch controller. The bus switch is preferably positioned at a first stage of the second bus. In one example, a first status of the first element is powered-on and the status of the second element is powered-off and the control signal turns off the second bus.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent

DETAILED DESCRIPTION OF THE PREFERRED EMBODIMENTS

The present invention relates to a bus structure and method capable of attenuating digital noise affecting receive sensitivity of a mobile communication terminal.

Although the invention is illustrated with respect to a bus structure for a mobile terminal, it is contemplated that the invention may be utilized anywhere it is desired for providing noise switching of elements within a mobile communication system. Reference will now be made in detail to the preferred embodiments of the present invention, examples of which are illustrated in the accompanying drawings.

The present invention provides a bus structure capable of enhancing radio sensitivity of a mobile communication terminal by reducing radiated digital noise. In the present invention, a bus of an LCD module is disconnected from a common bus by using a bus switch, thereby preventing flow of digital noise.

Figure 1:
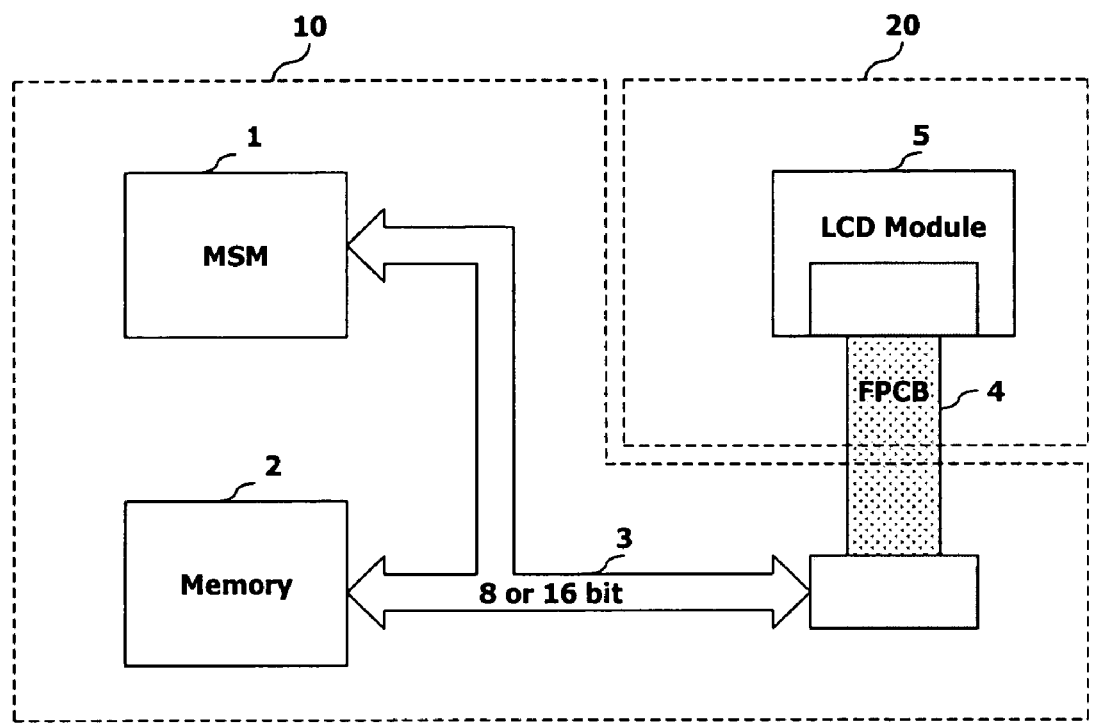
FIG. 1 illustrates a conventional bus structure used in a mobile communication terminal
Figure 2:
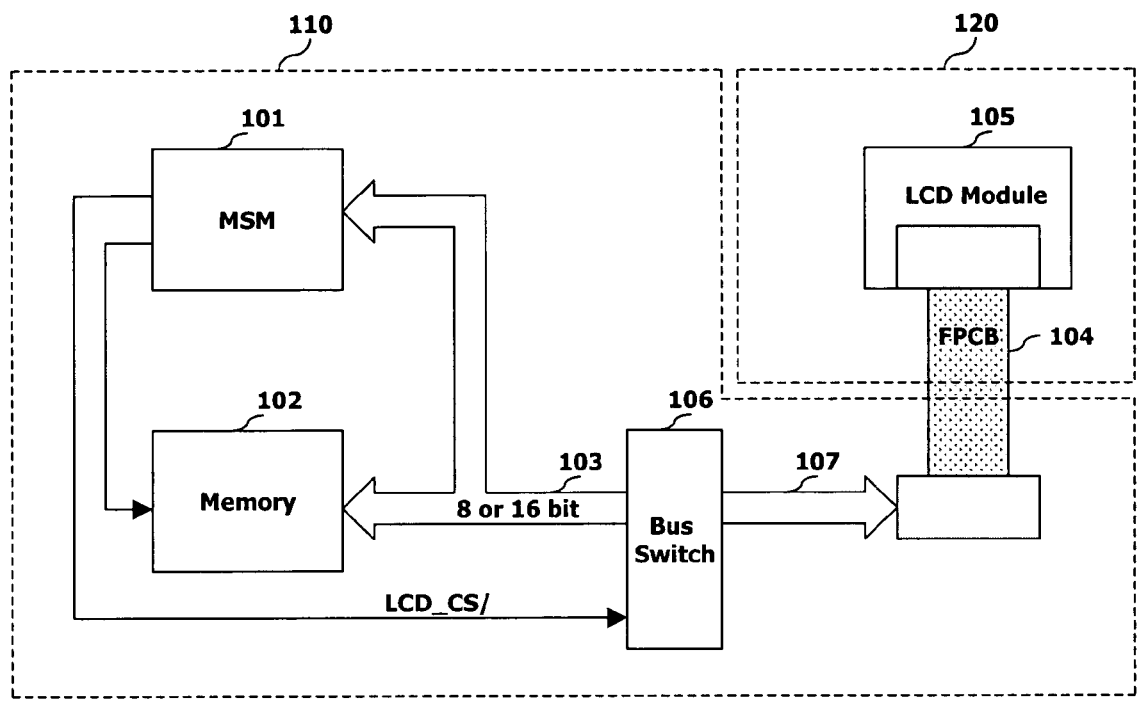
FIG. 2 illustrates a bus structure of a mobile communication terminal in accordance with a preferred embodiment of the present invention.

FIG. 2 illustrates a bus structure of a mobile communication terminal in accordance with a preferred embodiment of the present invention. The bus structure provides a bus switch 106 and a bus 107 of an LCD module 105.

The bus switch 106 connects or disconnects buses of commonly connected elements such the LCD module 105 to a mobile system modem (MSM) 101. The bus switch 106 is positioned proximal to a first stage of the bus 107. The first bus 107 radiates a large amount of digital noise due to a distal location from a common bus 103. The bus switch 106 is positioned at a first stage of an element positioned along an upper portion of the folder unit 120 located farthest from the MSM 101.

The method for reducing digital noise in the bus structure of the mobile communication terminal is explained below.

Upon the MSM 101 reading data from the memory 102 or writing data to the memory 102, an output control signal (LCD_CS) from the MSM 101 turns-off the bus switch 6 disconnecting the first bus 107 of the LCD module 105 from the common bus 103.

Upon the MSM 101 reading data from the LCD module 105 or writing data to the LCD module 105, the bus switch 106 connects the bus 107 of the LCD module 105 to the common bus 103.

Figure 3:
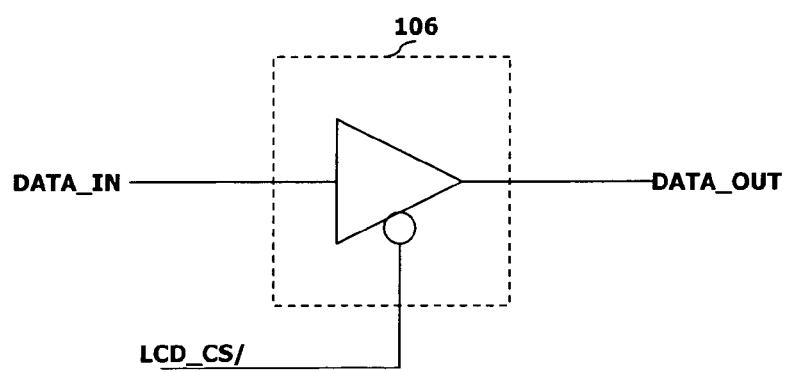
FIG. 3 illustrates a detailed construction of a bus switch of FIG. 2.

FIG. 3 illustrates a detailed schematic of the bus switch of FIG. 2.

The bus switch 106 is preferably a general integrated logic (IC) for connecting or disconnecting a bus. The bus switch 106, in this exemplary example, is a tri-state buffer that is turned on or off in accordance with a control signal (LCD_CS).

If the common bus 103 is 16 bits, an input terminal of the bus switch 106 is connected to a 16-bit data line and an output terminal is connected to a 16-bit LCD data line.

Figure 4:
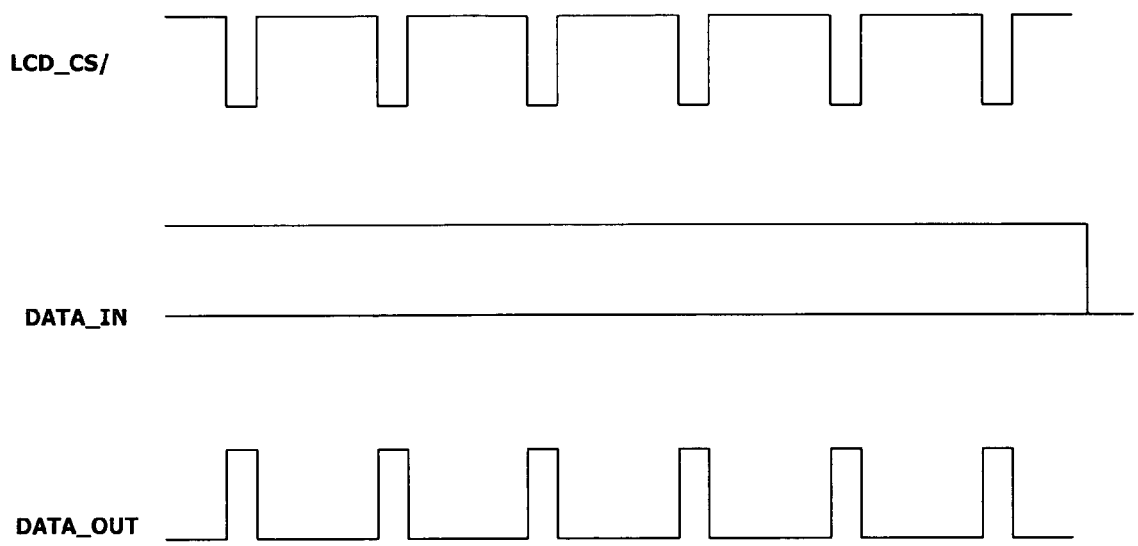
FIG. 4 illustrates signal timings of input/output of the bus switch of FIG. 2, in accordance with one embodiment.

The bus switch 106 provides a control terminal for turning on or off the bus switch 106. When the MSM 101 and the memory 102 exchange data, as shown in FIG. 4, the MSM 101 outputs a high level control signal (LCD_CS/) turning off the bus switch 106. The bus 107 disconnects the LCD module 105 from the common bus 103 which prevents input data (DATA_IN) of the bus switch 106 transmitted to an output terminal.

When the MSM 101 writes data to the LCD module 105, the MSM 101 outputs a low level control signal (LCD_CS/) to turn off the bus switch 106. As a result, the bus 107 of the LCD module 105 is connected to the common bus 103, input data (DATA_IN) may be outputted as output data (DATA_OUT) while the bus switch is in an ON state.

When the control signal (LCD_CD/) is enabled, the bus switch 106 disconnects the bus 107 of the LCD module 105 from the common bus, thus, the bus switch 106 prevents radiated digital noise from the LCD module 105 propagating along the bus structure.

The present invention provides a bus for a digital signal line of an element positioned along an upper portion of the folder, such as the LCD module. The bus disconnects the element from a common bus as necessary to reduce radiated digital noise of the terminal. The reduction in radiated digital noise enhances radio sensitivity of the mobile communication terminal.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

Although the present invention is described in the context of a mobile terminal, the present invention may also be used in any wired or wireless communication systems using mobile devices, such as PDAs and laptop computers equipped with wired and wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

What is claimed is:

1. A bus structure of a mobile communication terminal, the structure comprising:
    a bus switch controller;
    a first element having a first bus;
    a second element having a second bus;
    a common bus for connecting the first bus and the second bus; and
    a bus switch positioned between the first element and the second element for disconnecting at least one of the first bus and the second bus from the common bus in response to a control signal from the bus switch controller for reducing digital noise of the common bus, wherein the control signal is determined by one of a plurality of statuses of at least one of the first element and the second element.

2. The structure of claim 1, wherein the first element is a memory and the second element is a liquid crystal display module.

3. The structure of claim 1, wherein the second element is distally located from the bus controller.

4. The structure of claim 1, wherein the bus switch is positioned at a first stage of the second bus.

5. The structure of claim 1, wherein the bus switch is a tri-state buffer.

6. The structure of claim 1, wherein when the first element uses the common bus, the bus switch disconnects the second bus from the common bus.

7. The structure of claim 1, wherein when the second element uses the common bus, the bus switch connects the second bus to the common bus.

8. The structure of claim 1, wherein the mobile communication terminal is a folder type terminal.

9. The structure of claim 1, wherein the status of the first element is powered-on and the status of the second element is powered-off.

10. A bus structure of a mobile communication terminal, the bus structure comprising:
   a bus switch controller;
   a memory having a first bus;
   a liquid crystal display having a second bus;
   a common bus for connecting the first bus and the second bus; and
   a bus switch positioned between the memory and the liquid crystal display for disconnecting at least one of the first bus and the second bus from the common bus in response to a control signal from the bus switch controller for reducing digital noise of the common bus, wherein the control signal is determined by one of a plurality of statuses of at least one of the memory and the liquid crystal display.

11. The structure of claim 10, wherein the bus switch is positioned at a first stage of the second bus.

12. The structure of claim 10, wherein the bus switch is a tri-state buffer.

13. The structure of claim 10, wherein when the memory uses the common bus, the bus switch disconnects the second bus from the common bus.

14. The structure of claim 10, wherein when the liquid crystal display uses the common bus, the bus switch connects the second bus to the common bus.

15. A method for disconnecting elements along a bus structure of a mobile communication terminal, the method comprising:
   providing a control signal to a bus switch controller for at least one of connecting to or disconnecting from a common bus a first bus of a first element; and
   providing the control signal to the bus switch controller for at least one of connecting to or disconnecting from the common bus a second bus of a second element,
   wherein the bus switch controller detects a first status of the first element and a second status of the second element and modifies the control signal based upon the first status and the second status, wherein modifying of the control signal is for reducing digital noise of the common bus.

16. The method of claim 15, wherein the first element is a memory and the second element is a liquid crystal display module.

17. The method of claim 15, wherein the second element is distally located from the bus switch controller.

18. The method of claim 15, wherein the bus switch is positioned at a first stage of the second bus.

19. The method of claim 15, wherein a first status of the first element is powered-on and the status of the second element is powered-off and the control signal turns off the second bus.

* * * * *